United States Patent
Nistler et al.

(10) Patent No.: US 9,228,525 B2
(45) Date of Patent: Jan. 5, 2016

(54) METHOD AND SYSTEMS FOR ENGINE FUEL INJECTION CONTROL

(71) Applicant: General Electric Company, Schenectady, NY (US)

(72) Inventors: Paul Gerard Nistler, Lawrence Park, PA (US); Luke Henry, Lawrence Park, PA (US); Jeffrey David Willis, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 215 days.

(21) Appl. No.: 13/886,486

(22) Filed: May 3, 2013

(65) Prior Publication Data

US 2014/0330504 A1 Nov. 6, 2014

(51) Int. Cl.
*F02D 41/40* (2006.01)
*F02D 41/30* (2006.01)
*F02D 41/24* (2006.01)
*F02D 35/02* (2006.01)
*F02D 41/14* (2006.01)

(52) U.S. Cl.
CPC ........ *F02D 41/3005* (2013.01); *F02D 41/2416* (2013.01); *F02D 41/2419* (2013.01); *F02D 41/40* (2013.01); *F02D 35/023* (2013.01); *F02D 41/2467* (2013.01); *F02D 2041/1429* (2013.01); *F02D 2200/0602* (2013.01); *Y02T 10/44* (2013.01)

(58) Field of Classification Search
CPC . F02D 41/40; F02D 41/2416; F02D 41/2419; F02D 41/2467; F02D 41/3005; F02D 2041/1429; F02D 2200/0602
See application file for complete search history.

(56) References Cited

U.S. PATENT DOCUMENTS

| | | | | |
|---|---|---|---|---|
| 4,359,032 A | | 11/1982 | Ohie | |
| 4,543,929 A | * | 10/1985 | Kataoka et al. | 123/263 |
| 5,718,203 A | * | 2/1998 | Shimada et al. | 123/305 |
| 5,950,598 A | | 9/1999 | Wenzlawski et al. | |
| 6,961,651 B2 | * | 11/2005 | Oshima | 701/104 |
| 7,520,265 B2 | * | 4/2009 | Ishizuka | 123/435 |
| 8,095,294 B1 | * | 1/2012 | Griffiths et al. | 701/103 |

(Continued)

FOREIGN PATENT DOCUMENTS

| | | |
|---|---|---|
| DE | 19645715 A1 | 5/1997 |
| FR | 2762647 A1 | 10/1998 |

(Continued)

OTHER PUBLICATIONS

European Search Report and Written Opinion issued in connection with corresponding EP Application No. 14166725.3-1606 dated Sep. 19, 2014.

*Primary Examiner* — Erick Solis
(74) *Attorney, Agent, or Firm* — GE Global Patent Operation; John A. Kramer

(57) ABSTRACT

Various methods and systems are provided for indexing an injector map and subsequently controlling fuel injection to an engine. In one embodiment, a non-transitory computer readable storage medium with memory comprises fuel injector activation data indexed in the memory according to an input parameter, instructions for determining a modified pressure value based on a determined pressure and a modified pressure function, and instructions for generating a fuel injector activation output by interpolating among the indexed fuel injector activation data with the modified pressure value as the input parameter.

20 Claims, 4 Drawing Sheets

(56) References Cited

U.S. PATENT DOCUMENTS

2007/0144492 A1* 6/2007 Sugiyama et al. ............ 123/480
2010/0292911 A1   11/2010 Cologna

FOREIGN PATENT DOCUMENTS

GB          2284908 A     6/1995
WO     WO 98/55762 A1   12/1998

* cited by examiner

FIG. 2

| Fuel Value (mm^3/stroke) | Fuel Rail Pressure (FRP) | | | |
|---|---|---|---|---|
| | 600 | 1000 | 1200 | .... |
| 0 | 0.6 | 0.5 | 0.4 | .... |
| 50 | 1.0 | 0.8 | 0.7 | .... |
| 100 | 1.2 | 0.9 | 0.8 | .... |
| 150 | 1.5 | 1.1 | 1.0 | .... |
| 200 | 1.8 | 1.2 | 1.1 | .... |
| ⋮ | .... | .... | .... | .... |

| Fuel Value (mm^3/stroke) | SQRT(RP − constant) | | | |
|---|---|---|---|---|
| | $\sqrt{600-C}$ | $\sqrt{1000-C}$ | $\sqrt{1200-C}$ | .... |
| 0 | 0.6 | 0.5 | 0.4 | .... |
| 50 | 1.0 | 0.8 | 0.7 | .... |
| 100 | 1.2 | 0.9 | 0.8 | .... |
| 150 | 1.5 | 1.1 | 1.0 | .... |
| 200 | 1.8 | 1.2 | 1.1 | .... |
| ⋮ | .... | .... | .... | .... |

METHOD AND SYSTEMS FOR ENGINE FUEL INJECTION CONTROL

FIELD

Embodiments of the subject matter disclosed herein relate to methods and systems for controlling a common rail fuel system of an engine.

BACKGROUND

Vehicles, such as rail vehicles, include power sources, such as diesel engines. In some vehicles, fuel is provided to the diesel engine by a common rail fuel system. In the common fuel rail system, fuel injectors inject fuel from the common fuel rail to cylinders of the engine for combustion. Some engine systems may use an injector map stored within a memory of a controller to determine a fuel injector activation output. In one example, the fuel injector activation output may include an injector activation time, and/or an amount of time the injectors are injecting fuel into the engine cylinders. The injector map may include a table of injector activation data with each injector activation time corresponding to a fuel rail pressure and a fuel value, or quantity of fuel injected by a single fuel injector stroke. Thus, by using the injector map, an engine controller may output an injector activation time for a given fuel value and measured fuel rail pressure. Fuel injection may then be adjusted, based on the determined injector activation time, to deliver the desired amount of fuel to the engine cylinders.

The injector map described above may include a finite number of data points. Thus, in one example, the exact measured fuel rail pressure and desired fuel value may not be included in the injector table. As a result, the engine controller may interpolate between data points above and below the desired points to determine the injector activation time.

However, linearly interpolating between available fuel rail pressure values and fuel values in the injector map may result in interpolation error. Specifically, indexing the injector map by rail pressure may result in a non-linear relationship between fuel injector activation data. Therefore, linearly interpolating non-linear data may result in interpolation inaccuracies, thereby increasing fuel injector activation time error. This may in turn decrease fuel consumption efficiency and increase emissions variation.

BRIEF DESCRIPTION

In one embodiment, a non-transitory computer readable storage medium with memory comprises fuel injector activation data indexed in the memory according to an input parameter, instructions for determining a modified pressure value based on a determined pressure and a modified pressure function, and instructions for generating a fuel injector activation output by interpolating among the indexed fuel injector activation data with the modified pressure value as the input parameter.

In this way, the modified pressure function may transform the fuel injector activation data stored in the injector table to be more linear between cells of the injector table. As such, interpolation error may decrease, thereby increasing the accuracy of the determined injector activation output. As a result, fuel injector control based on the determined injector activation output may be more accurate, thereby increasing fuel consumption efficiency and reducing emissions variation.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIG. 2 shows fuel injector tables according to an embodiment of the invention.

DETAILED DESCRIPTION

The following description relates to various embodiments for indexing an injector map and subsequently controlling fuel injection to an engine. An amount of fuel injected into an engine cylinder by a fuel injector may be based on a fuel rail pressure and an injector activation time (e.g., an amount of time the injector injects fuel). Further, fuel injection data for controlling fuel injection may be stored within a memory of an engine controller. For example, the fuel injection data may include fuel injection activation times for various fuel values and fuel rail pressures. In other words, the fuel injection activation data may be indexed by fuel rail pressure and fuel value. The engine controller may then determine a fuel injection activation time by interpolating among the injector table data based on a determined fuel rail pressure (e.g., measured pressure) and desired fuel value. In this way, the fuel injectors may be activated based on the resulting fuel injector activation time in order to deliver a desired amount of fuel at a given fuel rail pressure.

However, indexing the injector table in this may lead to interpolation inaccuracies due to a non-linear relationship between the injector data. By making the relationship between injector activation data more linear, interpolation inaccuracies may be reduced, thereby increasing fuel injector activation time accuracy. For example, the injector table may be indexed by a modified pressure instead of the fuel rail pressure alone. The modified pressure may be based on a modified pressure function and a determined or measured fuel rail pressure. As such, the modified pressure function may transform the fuel injector activation data stored in the injector table to be more linear between cells of the injector table. Interpolation between the transformed data may reduce interpolation error, thereby resulting in a more accurate fuel injector activation time and more accurate control of fuel injection to the engine.

The approach described herein may be employed in a variety of engine types, and a variety of engine-driven systems.

Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Figure 1:
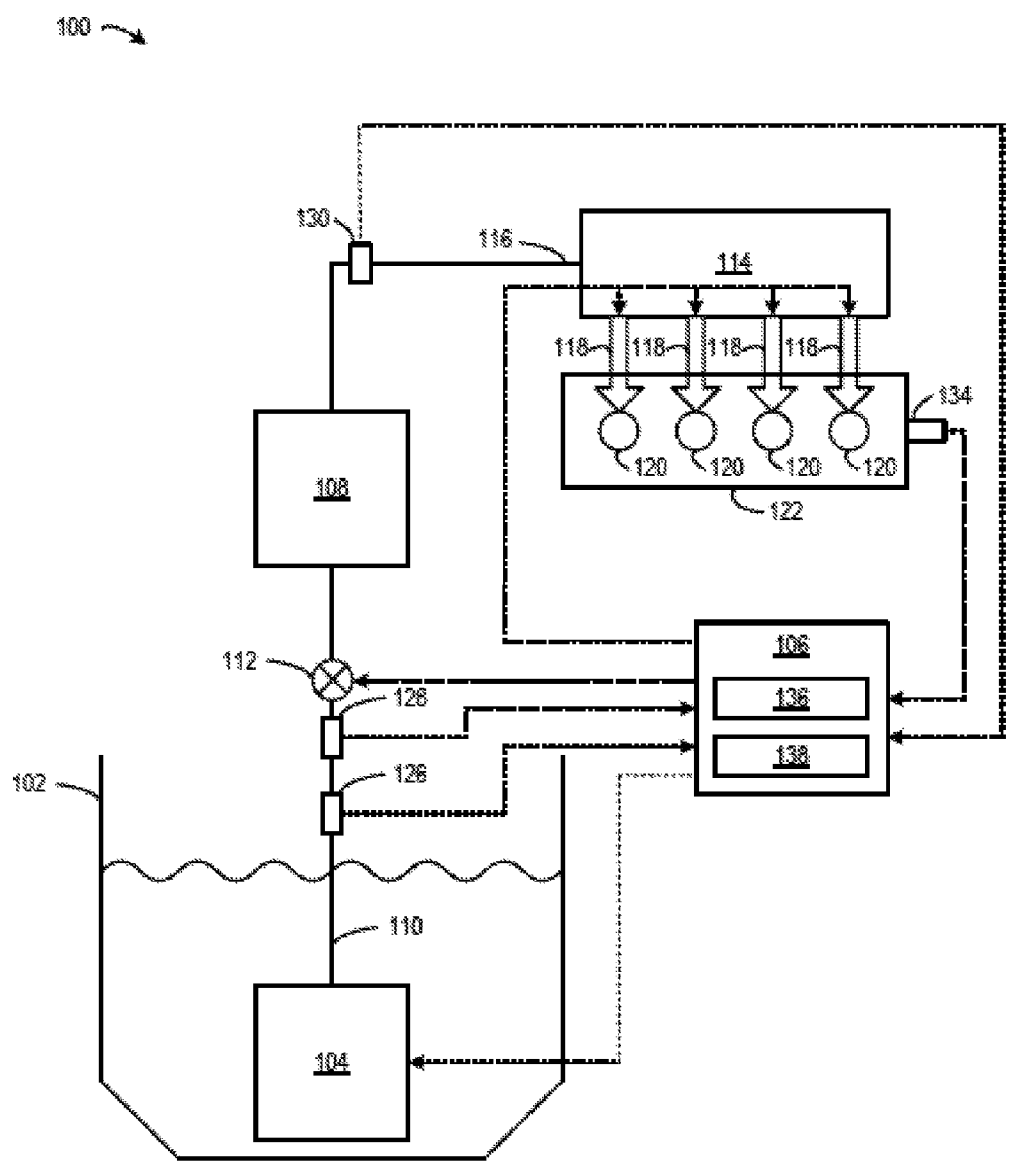
FIG. 1 shows a schematic diagram of a common fuel rail system according to an embodiment of the invention.

Before further discussion of the approach for indexing an injector map and subsequently controlling fuel injection to an engine, an example of a fuel system for an engine is disclosed. For example, FIG. 1 shows a block diagram of a common rail fuel system (CRS) 100 for an engine of a vehicle, such as a rail vehicle. Liquid fuel is sourced or stored in a fuel tank 102. A low-pressure fuel pump 104 is in fluid communication with the fuel tank 102. In the embodiment shown in FIG. 2, the low-pressure fuel pump 104 is disposed inside of the fuel tank 102 and can be immersed below the liquid fuel level. In alternative embodiments, the low-pressure fuel pump may be coupled to the outside of the fuel tank and pump fuel through a suction device. Operation of the low-pressure fuel pump 104 is regulated by a controller 106.

Liquid fuel is pumped by the low-pressure fuel pump 104 from the fuel tank 102 to a high-pressure fuel pump 108 through a conduit 110. A valve 112 is disposed in the conduit 110 and regulates fuel flow through the conduit 110. For example, the valve 112 is an inlet metering valve (IMV). The IMV 112 is disposed upstream of the high-pressure fuel pump 108 to adjust a flow rate of fuel that is provided to the high-pressure fuel pump 108 and further to a common fuel rail 114 for distribution to a plurality of fuel injectors 118 for fuel injection. For example, the IMV 112 may be a solenoid valve, opening and closing of which is regulated by the controller 106. In other words, the controller 106 commands the IMV to be fully closed, fully open, or a position in between fully closed and fully opened in order to control fuel flow to the high-pressure fuel pump 108 to a commanded fuel flow rate. During operation of the vehicle, the IMV 112 is adjusted to meter fuel based on operating conditions, and during at least some conditions may be at least partially open. It is to be understood that the valve is merely one example of a control device for metering fuel and any suitable control element may be employed without departing from the scope of this disclosure. For example, a position or state of the IMV may be electrically controlled by controlling an IMV electrical current. As another example, a position or state of the IMV may be mechanically controlled by controlling a servo motor that adjusts the IMV.

The high-pressure fuel pump 108 increases fuel pressure from a lower pressure to a higher pressure. The high-pressure fuel pump 108 is fluidly coupled with the common fuel rail 114. The high-pressure fuel pump 108 delivers fuel to the common fuel rail 114 through a conduit 116. A plurality of fuel injectors 118 are in fluid communication with the common fuel rail 114. Each of the plurality of fuel injectors 118 delivers fuel to one of a plurality of engine cylinders 120 in an engine 122. Fuel is combusted in the plurality of engine cylinders 120 to provide power to the vehicle through an alternator and traction motors, for example. Operation of the plurality of fuel injectors 118 is regulated by the controller 106. In the embodiment of FIG. 1, the engine 122 includes four fuel injectors and four engine cylinders. In alternate embodiments, more or fewer fuel injectors and engine cylinders can be included in the engine.

Fuel pumped from the fuel tank 102 to an inlet of the IMV 112 by the low-pressure fuel pump 104 may operate at what is referred to as a lower fuel pressure or engine fuel pressure. Correspondingly, components of the CRS 100 which are upstream of the high-pressure fuel pump 108 operate in a lower fuel pressure or engine fuel pressure region. On the other hand, the high-pressure fuel pump 108 may pump fuel from the lower fuel pressure to a higher fuel pressure or rail fuel pressure. Correspondingly, components of the CRS 100 which are downstream of the high-pressure fuel pump 108 are in a higher-fuel pressure or rail fuel pressure region of the CRS 100.

A fuel pressure in the lower fuel pressure region is measured by a pressure sensor 126 that is positioned in the conduit 110. The pressure sensor 126 sends a pressure signal to the controller 106. In an alternative application, the pressure sensor 126 is in fluid communication with an outlet of the low-pressure fuel pump 104. A fuel temperature in the lower fuel pressure region is measured by a temperature sensor 128 that is positioned in conduit 110. The temperature sensor 128 sends a temperature signal to the controller 106.

A fuel pressure in the higher fuel pressure region is measured by a pressure sensor 130 that is positioned in the conduit 116. The pressure sensor 130 sends a pressure signal to the controller 106. The controller 106 uses this pressure signal to determine a rail pressure of fuel (e.g., FRP) in the common fuel rail. As such, the fuel rail pressure (FRP) is provided to the controller 106 by the pressure sensor 130. In an alternative application, the pressure sensor 130 is in fluid communication with an outlet of the high-pressure fuel pump 108. Note that in some applications various operating parameters may be generally determined or derived indirectly in addition to or as opposed to being measured directly.

In addition to the sensors mentioned above, the controller 106 receives various signals from a plurality of engine sensors 134 coupled to the engine 122 that may be used for assessment of fuel control health and associated engine operation. For example, the controller 106 receives sensor signals indicative of air-fuel ratio, engine speed, engine load, engine temperature, ambient temperature, fuel value, a number of cylinders actively combusting fuel, and the like. In the illustrated implementation, the controller 106 is a computing device, such as microcomputer that includes a processor unit 136, non-transitory computer-readable storage medium device 138, input/output ports, memory, and a data bus. The computer-readable storage medium 138 included in the controller 106 is programmable with computer readable data representing instructions executable by the processor for performing the control routines and methods described below as well as other variants that are not specifically listed.

The controller 106 is operable to adjust various actuators in the CRS 100 based on different operating parameters received or derived from different signals received from the various sensors, to dynamically assess the health of the CRS and control operation of the engine based on the assessment. For example, in an embodiment, the controller 106 is operable to adjust fuel injection to the engine. Specifically, the controller may adjust fuel injection timing of one or more fuel injectors based on a determined injector activation time. This may include adjusting a pulse width modulation signal to command the plurality of fuel injectors to inject fuel for a duration.

The controller 106 is also operable to generate a fuel injector activation output, such as the fuel injector activation time, based on operating conditions of the CRS and stored fuel injector activation data. The fuel injector activation data may be stored within the memory of the computer-readable storage medium of the controller. In one example, the fuel injector activation data may be stored within an injector table or map, such as the first injector table 200 or the second injector table 202 shown in FIG. 2.

FIG. 2 shows two example injector tables. A first injector table 200 contains fuel injector activation data indexed in the memory by a pressure value, such as a fuel rail pressure (FRP). A second injector table 202 contains injector activation data indexed in the memory by a modified pressure value, such as a modified fuel rail pressure. The second injector table 202 represents an example of an alternate method of indexing an injector table, discussed further below. The first injector table 200 represents an example of a standard method for indexing an injector table.

As shown in FIG. 2, the first injector table 200 includes a series of fuel rail pressure (FRP) values on the x-axis (e.g., horizontal axis) or first row 204 of the table. In one example, the series of fuel rail pressures may range from 600 to 2200 bar. In another example, the series of fuel rail pressures may range from 400 to 2800 bar. Further, the injector table 200 includes a series of fuel values on the y-axis (e.g., vertical axis) or first column 206 of the table. In one example, the series of fuel values may range from 0 to 3000 mm$^3$/stroke. In another example, the series of fuel values may range from 0 to a fuel value greater than 3000 mm$^3$/stroke. The above listed ranges for the series of fuel rail pressures and fuel values may change (e.g., be larger or smaller) based on the engine application. The injector table 200 also includes a series of cells containing fuel injector activation data. In one example, the fuel injector activation data may be fuel injector activation times (e.g., an injector open time or the amount of time the injectors are activated and injecting fuel into engine cylinders). In this example, each cell contains a fuel injector activation time which corresponds to one fuel rail pressure and one fuel value. In another example, the fuel injector activation data may be another fuel injection parameter.

The first injector table 200 may have a first number of columns and a second number of rows, both greater than 1. The first number and the second number may be a maximum number of rows and a maximum number of columns. In one example, the maximum number of rows and the maximum number of columns may not be the same. In another example, the maximum number of rows and the maximum number of columns may be less than 50. As such, the table may include a finite number of data points. For example, if the maximum number of rows is 10 and the maximum number of columns is 8, there may be 10 rows and 8 columns of fuel injector activation data. Specifically, there may be 8 fuel rail pressure values in the first row 204 and 10 fuel values in the first column 206. Thus, in this example, there are 80 fuel injector activation data points, or fuel injector activation times. In one example, the maximum number of columns and rows may be based on the available amount of memory or space within the computer readable medium of the controller. For example, as the number of data points, or columns and rows, increase, the amount of memory usage increases. Thus, the number of data points in the injector table may be limited by memory usage requirements.

The controller 106 is operable to generate a fuel injector activation output, such as a fuel injector activation time, using a fuel injector table stored in the controller memory, a determined pressure, and a fuel value. In one example, the determined pressure may be a measured fuel rail pressure measured using a pressure sensor in the CRS (e.g., using pressure sensor 130 shown in FIG. 1). In another example, the determined pressure may be a fuel rail pressure estimated from the pressure sensor and/or additional engine operating conditions. The fuel value may be a quantity of fuel injected by a single fuel injector stroke (also referred to as a fuel charge). In one example, the fuel value may be a pre-determined value for the engine. As such, the fuel value may be stored in the controller. In another example, the fuel value may be based on engine operating conditions such as torque demand. The controller may inject the desired amount of fuel at a given (e.g., determined) fuel rail pressure by activating the fuel injectors for a specific amount of time. This amount of time, or the injector activation time, may be determined from the data in the injector activation table.

Specifically, the controller may look up the determined or measured fuel rail pressure and the desired fuel value in the injector table. As discussed above, the injector activation table may have a finite number of data points. Since the injector table may have a maximum number of rows and columns, the exact determined fuel rail pressure and desired fuel value may not be included in the injector table. As a result, the engine controller may interpolate between data points, around the desired points, to determine the injector activation time.

In an alternate embodiment, if the determined fuel rail pressure and desired fuel value are outside of the ranges of values listed in the injector table, the controller may extrapolate using the closest data points within the injector table. As such, similar methods as presented below for injector map interpolation may be used for extrapolation to determine an injector activation time at the desired operating points.

The injector map interpolation may include a multi-step (e.g., two dimensional) linear interpolation. For a given fuel value and fuel rail pressure, four data points may be selected in the injector table. In one example, the given (e.g., determined) fuel rail pressure and fuel value may be 1100 bar and 75 mm$^3$/stroke, respectively. Referring to the first injector table 200, both these values are between two fuel values and two fuel rail pressures listed in the first injector table 200. As a result, the controller must perform a multi-step linear interpolation between the four closest data points (cells 212, 214, 216, and 218 in the table), each corresponding to a fuel rail pressure and fuel value either above or below the given values.

In another example, the given or desired fuel value may be listed in the injector table while the determined fuel rail pressure is not. In this example, a one-way linear interpolation may be performed by the controller between the two closest data points corresponding to a fuel rail pressure above and a fuel rail pressure below the measured fuel rail pressure, at the given fuel value. Specifically, this may include interpolating between a first fuel injection activation time corresponding to a first fuel rail pressure and the given fuel value and a second fuel injection activation time corresponding to a second fuel rail pressure and the given fuel value. The first fuel rail pressure may be greater than the determined fuel rail pressure while the second fuel rail pressure may be less than the determined fuel rail pressure.

However, linearly interpolating between available fuel rail pressure values and fuel values in the injector map may result in interpolation error. Specifically, indexing the injector map by fuel rail pressure, as shown in the first injector table 200, may result in a non-linear relationship between fuel injector activation data. Consequently, linearly interpolating non-linear data may result in interpolation inaccuracies, thereby increasing fuel injector activation time error. This may in turn decrease fuel consumption efficiency and increase emissions variation.

Figure 3:
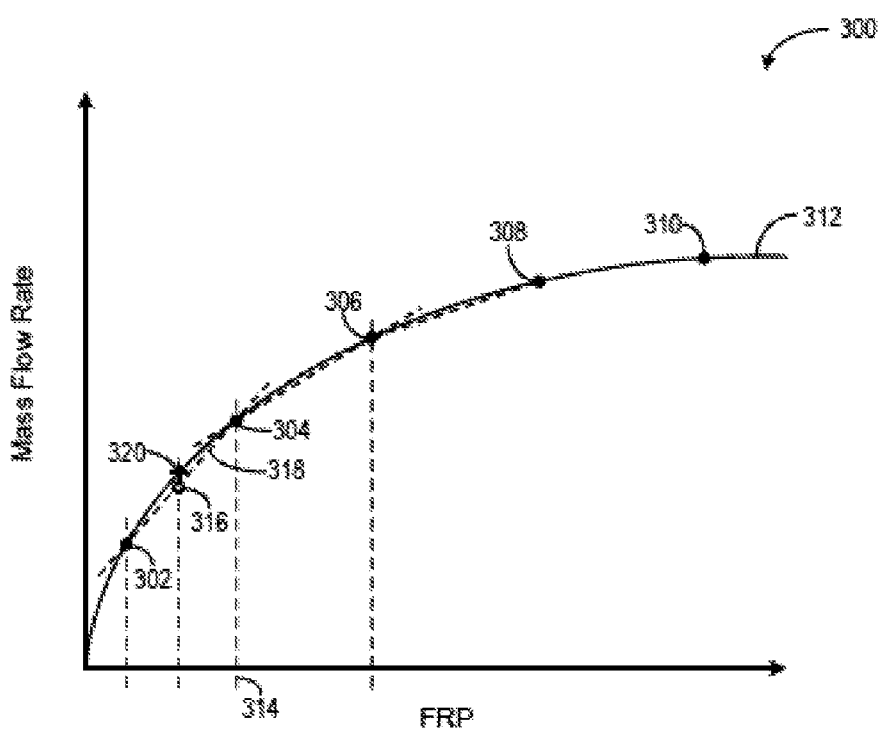
FIG. 3 shows a graph of a relationship between a mass flow rate and fuel rail pressure according to an embodiment of the invention.

Linear interpolation inaccuracies due to indexing the injector table by fuel rail pressure are illustrated by the example graph 300 in FIG. 3. Specifically, graph 300 shows a relationship between a mass flow rate of fluid (e.g., fuel) and fuel rail pressure. The relationship between a mass flow rate of a fluid and a pressure drop between two points in a fluid flow path may be derived using conservation of energy and fluid dynamics principles. The relationship shows that the mass flow rate of a fluid between two points is proportional to the square root of the pressure drop between the two points. Thus, a graph of mass flow rate vs. fuel rail pressure resembles a square root function, as shown in the graph 300.

Graph 300 shows several data points (302, 304, 306, 308, and 310) along the square root curve 312, each data point corresponding to a fuel rail pressure and a mass flow rate. In one example, these data points may be given in a look-up table in the memory of the controller. For a selected fuel rail pressure, denoted by the line 314, the corresponding mass flow rate may be determined by interpolating between the closest values in the look-up table. The closest values in this example may be a first data point 302 and a second data point 304. Linearly interpolating between the first data point 302 and the second data point 304 results in a mass flow rate value 316 along an interpolation line 318. However, the actual mass flow rate value at the selected fuel rail pressure is at 320. Since the relationship between mass flow rate and fuel rail pressure is non-linear, the linear interpolation between data points results in an error in the determined mass flow rate value. This error may increase as the number of data points on the curve decreases and/or at sections of the curve with a larger slope (e.g., larger changes in mass flow rate for a given change in fuel rail pressure).

Alternatively, if mass flow rate is plotted against the square root of the fuel rail pressure, the resulting mass flow rate curve becomes more linear. An example of this relationship is shown in an example graph 400 in FIG. 4. Specifically, graph 400 shows mass flow rate plotted against the square root of the fuel rail pressure. As shown in graph 400, this results in a linear curve 402. In alternate examples, the curve may not be entirely linear, but still more linear than the square root curve.

Figure 4:
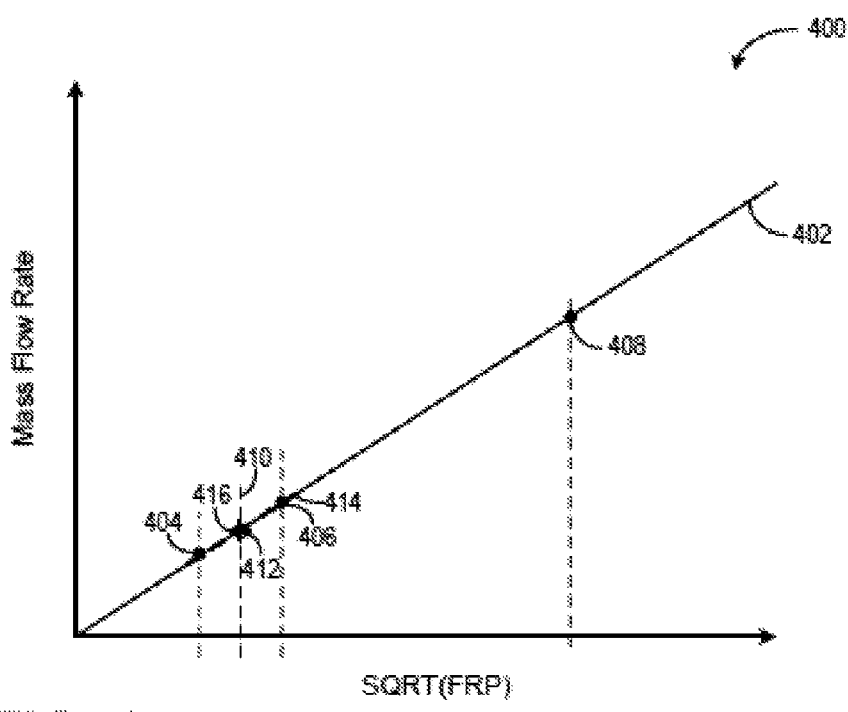
FIG. 4 shows a graph of a relationship between a mass flow rate and a square root of a fuel rail pressure according to an embodiment of the invention.

Graph 400 shows several data points (404, 406, and 408) along the linear curve 402, each data point corresponding to the square root of a fuel rail pressure and a mass flow rate. In one example, these data points may be given in a look-up table stored in the memory of the controller. For a selected fuel rail pressure, the controller may determine the square root of the selected fuel rail pressure. Then, at the square root of the selected fuel rail pressure, denoted by the line 410, the corresponding mass flow rate may be determined by interpolating between the closest values in the look-up table. The closest values in this example may be a first data point 404 and a second data point 406. Linearly interpolating between the first data point 404 and the second data point 406 results in a mass flow rate value 412 along an interpolation line 414. As shown in FIG. 4, the interpolation line 414 runs along the linear curve 402. Thus, the actual mass flow rate value 416 at the selected fuel rail pressure is substantially the same as the mass flow rate value 412 determined by interpolation. If the linear interpolation was instead performed between the first data point 404 and a third data point 408, a similar resulting mass flow rate value may result. This is due to the linear nature of the curve. Thus, in a look-up table, fewer data points may be used while obtaining a similar level of accuracy. Storing fewer data points within the look-up table may decrease memory usage in the computer readable medium of the controller.

The accuracy of linearly interpolation increases as the relationship between selected variables becomes more linear. Thus, linearly interpolating mass flow rate vs. the square root of the fuel rail pressure decreases interpolation error over linearly interpolating mass flow rate vs. the fuel rail pressure. For these reasons, indexing an injector map by a square root of the fuel rail pressure instead of indexing by fuel rail pressure alone may increase the accuracy in determining a fuel injector activation output variable (e.g., fuel injector activation time). This may in turn decrease fuel injector activation time error, thereby increasing fuel consumption efficiency and decreasing emissions variation.

As introduced above, FIG. 2 shows an example of a second injector table 202 which contains injector activation data indexed in the memory of the controller by a modified fuel rail pressure. In one example, the modified fuel rail pressure is the square root of the fuel rail pressure. As an example, the square root may be a function which approximates a square root function. In another example, the modified fuel rail pressure is the square root of the fuel rail pressure offset or adjusted by a correction factor. The correction factor may be based on a measured and/or estimated peak cylinder pressure, cylinder pressure at time of injection, losses between a fuel rail pressure sensor and an injector nozzle, and/or additional factors that may affect a pressure drop across a restriction of the fuel injector. In one example, the correction factor may be based on a cylinder pressure, such as a cylinder firing pressure, and/or a loss value. The loss value may be based on pressure losses in the fuel rail system between the fuel rail pressure sensor (such as pressure sensor 130 shown in FIG. 1) and a fuel injector nozzle. In alternate examples, the loss value may be fuel rail system pressure losses measured at an alternate location in the fuel rail system.

In one example, the cylinder pressure may be a pressure at the time of fuel injection. In some examples, fuel injection occurs within 20 degrees of top dead center in the engine cycle. As such, the cylinder firing pressure when fuel is injected into the engine cylinder may be a peak cylinder firing pressure.

The correction factor with which the fuel rail pressure is adjusted by may be pre-determined (e.g., calculated) and then stored in the controller to subtract from fuel rail pressure. The controller may then take the square root of the resulting pressure to obtain the modified pressure. Alternatively, the correction factor may be a determined value, continuously updated based on engine operating conditions. For example, the correction factor may be adjusted based on a current measured or estimated peak cylinder pressure, cylinder pressure at time of injection, and pressure losses between the fuel rail pressure sensor and the fuel injector nozzle. The controller may then offset the determined fuel rail pressure by the updated correction factor to obtain the modified pressure.

The second injector table 202 may be generated and/or stored within the memory of the controller by transforming the first injector table 200 by a modified pressure function. In one example, the modified pressure function includes a square root approximation. In another example, the modified pressure function includes a square approximation which further includes subtracting a correction factor. Specifically, in one example, the modified pressure function may be defined by the following formula:

$$MP = \sqrt{FRP - C} \qquad (1),$$

wherein MP is the modified pressure, FRP is a fuel rail pressure, and C is the correction factor, as described above. The modified pressure function listed above is consistent with an equation for incompressible flow across an orifice. As discussed above, the mass flow rate of fluid across the orifice (e.g., between two points) is proportional to the square root of the pressure difference between the points on either side of the orifice. Thus, the relationship between mass flow rate and a square root of the FRP is more linear than the FRP alone. As such, interpolation using the FRP pressure modified with the modified pressure function increases interpolation accuracy and fuel injector control.

The fuel rail pressures listed in the first row 204 of the first injector table 200 may be input into the modified pressure function to determine a set of modified pressure values. These modified pressure values are shown in the first row 210 of the second injector table 202. As such, the first row 210 includes a range of modified pressure values corresponding to a range of fuel rail pressures. As discussed above, in one example, the range of fuel rail pressures may vary from 600 to 2200 bar. The same injector activation data at the same fuel values as in the first injector table 200 is now in the second injector table 202. For example, the same range of fuel values as discussed above are listed in a first column 212 of the second injector table 212. However, now the injector activation data is indexed by the modified pressure in the second injector table 202, rather than the fuel rail pressure alone.

Adjusting data in the fuel injector table by the correction factor corrects for differences between pre-determined injector activation data and actual engine operating conditions. For example, an injector table (such as the first injector table 200) may be created during bench-top testing using a test stand instead of the actual engine in which the injector table is used. As such, the test stand may not exhibit the same pressure drop behavior between the FRP sensor and the fuel injector nozzle as in the operating engine. Additionally, the test stand may not have the same back-pressure or cylinder pressure (e.g., peak cylinder pressure) as the operating engine. Thus, the correction factor may compensate for all of the pressure-related differences between the operating engine and the equipment used to create the injector table. This engine-specific correction allows the same injector map to be used in a plurality of different engines. Further, the correction factor may change based on a current engine operating condition, thereby increasing the accuracy of the injector table in a given engine as engine system variables change.

The transformation in the injector table index by the square root function causes the fuel injector activation data stored in the second injector table 202 to be more linear than the fuel injector activation data stored in the first injector table 200. Consequently, linear interpolation between data in the second injector table 202 may result in less error in the resulting fuel injector activation output (e.g., fuel injector activation time). Since linear interpolation accuracy may be increased with indexing the fuel injector activation data by the modified pressure, less data points may result in the same amount of accuracy. As such, the size of the injector table stored in the controller memory may be reduced, thereby decreasing memory usage.

When indexing the injector table by the modified pressure, the input to the injector table must also be transformed by the modified pressure function. Thus, in equation 1 above, the FRP may be a determined fuel rail pressure. In one example, the determined fuel rail pressure may be measured by a pressure sensor, such as the pressure sensor 130 shown in FIG. 1, upstream of the fuel injectors. As such, a modified pressure is determined by inputting the determined fuel rail pressure into the modified pressure function. The determined modified pressure may then be used as the input into the indexed injector table to interpolate among the nearest indexed fuel injector activation data to determine a fuel injector activation output, such as a fuel injector activation time.

As discussed above, the fuel injector activation output may be used to control fuel injection of the engine system. Thus, the technical effect of the indexing and interpolating method described above (and further expanded upon below with reference to FIG. 5), it to increase the accuracy of fuel injector control. Specifically, by indexing an injector activation table by a modified pressure, the controller may determine a more accurate fuel injection activation time for the determined fuel rail pressure and desired fuel value. As such, injection timing may be adjusted based on the determined fuel injector activation time to deliver the desired amount of fuel. Delivering the accurate amount of fuel may increase fuel consumption efficiency of the engine while also decreasing engine emissions variation.

In some implementations, the computer-readable storage medium 138 has memory with one or more sets of instructions and/or data stored thereon that when accessed and executed by an electronic device (e.g., processor unit 136) cause the electronic device to perform various actions. Specifically, the computer-readable storage medium with memory may include fuel injector activation data indexed in the memory by an input parameter, instructions for determining a modified pressure value based on a determined pressure and a modified pressure function, and instructions for generating a fuel injector activation output by interpolating among the indexed fuel injector activation data with the modified pressure value as the input parameter. In one example, the determined pressure is a measured fuel rail pressure, the measured fuel rail pressure measured upstream of a fuel injector, and the modified pressure function includes a square root approximation. The modified pressure value may be further based on a representative cylinder pressure during injection and fuel rail system pressure losses. Additionally, the interpolating among the indexed fuel injector activation data is further based on a fuel value, the fuel value including a quantity of fuel injected by a single fuel injector stroke.

The fuel injector activation data may be stored in an injector table, the injector table having a first number of columns and a second number of rows, both greater than 1. A first row of the second number of rows includes a range of modified pressure values corresponding to a range of fuel rail pressures and a first column of the first number of columns includes a range of fuel values, the range of fuel values including a range of quantities of fuel injected by a single fuel injector. Further, each cell in the injector table includes a fuel injector activation time corresponding to one of the modified pressure values in the range of modified pressure values and one of the fuel values in the range of fuel values.

The modified pressure function transforms the fuel injector activation data stored in the injector table to be more linear between cells of the injector table. The computer-readable storage medium further includes instructions for performing a multi-step linear interpolation between indexed fuel injector activation data in the injector table to determine a fuel injector activation time at the determined pressure and fuel value. Additionally, the computer-readable storage medium includes instructions for outputting the determined fuel injector activation time and adjusting fuel injection based on the determined fuel injector activation time. In one example, adjusting fuel injection includes adjusting an injector open time.

Further, the system of FIG. 1 provides for a fuel rail system comprising a common fuel rail, a plurality of fuel injectors operable to inject fuel from the common fuel rail to cylinders of an engine, an injector table stored within a computer memory, and a controller operable to adjust fuel injection to the cylinders based on a fuel injector activation time, the fuel injector activation time determined by indexing injector data stored in the injector table by a modified pressure function, the modified pressure function including a square root of a rail pressure offset by a peak pressure in the cylinders and pressure losses in the fuel rail system, and interpolating the indexed injector data based on a determined fuel rail pressure and a quantity of fuel injected by a single fuel injector stroke. In one example, the determined fuel rail pressure is measured from one or more pressure signals sent to the controller by at least one pressure sensor positioned upstream of the common fuel rail.

In another embodiment of the invention, the system of FIG. 1 provides for a fuel rail system comprising a common fuel rail, a plurality of fuel injectors operable to inject fuel from the common fuel rail to cylinders of an engine, a non-transitory computer readable storage medium with memory, wherein an injector table is stored within the memory, and wherein the injector table comprises injector data indexed according to a modified pressure function, and a controller operable to control the fuel injectors based on a fuel injector activation time, wherein the controller is configured to determine the fuel injector activation time by interpolating the indexed injector data based on a determined fuel rail pressure and a quantity of fuel injected by a single fuel injector stroke. The modified pressure function includes a square root of a fuel rail pressure offset by a peak pressure in the cylinders and pressure losses in the fuel rail system. Further, the determined fuel rail pressure may be measured from one or more pressure signals sent to the controller by at least one pressure sensor positioned upstream of the common fuel rail.

In one embodiment, a line of engines may include a plurality of different engines and/or engine types. All of the engines in the line of engines may have the same fuel injectors. Additionally, the same fuel injector activation data may be stored in a fuel injector table within a memory of a computer-readable storage medium in each engine. As such, each engine may have a common fuel injector table. However, the plurality of engines in the line of engines may have different peak cylinder pressures. As described above, the data stored in the common fuel injector table may be indexed by a modified pressure function including a square root of a rail pressure offset by the peak cylinder pressure and pressure losses in the fuel rail system. The peak cylinder pressure for each engine may be individually stored within the memory of the corresponding engine. As such, upon indexing the data in the common fuel injector table, an engine controller may input the stored peak cylinder pressure into the modified pressure function and then index the stored fuel injector activation data. In this way, the same fuel injector activation table may be stored in multiple engines and/or engine types and used to determine fuel injector activation times with increased accuracy.

For example, the line of engines may include a first engine and a second engine, both engines having the same fuel injectors. The first engine may include a first injector table stored in a first computer memory and the second engine may include a second fuel injector table stored in a second computer memory, the first injector table and the second injector table being the same. Further, the first engine may have a first peak cylinder pressure and the second engine may have a second peak cylinder pressure, the first peak cylinder pressure being different than the second peak cylinder pressure. A first controller included in the first engine may then index injector data stored within the first injector table by a modified pressure function, the modified pressure function including a square root of a fuel rail pressure offset by the first peak cylinder pressure and pressure losses in the fuel rail system. Similarly, a second controller included in the second engine may index injector data stored within the second injector table by the same modified pressure function but offset by the second peak cylinder pressure and pressure losses in the fuel rail system.

Figure 5:
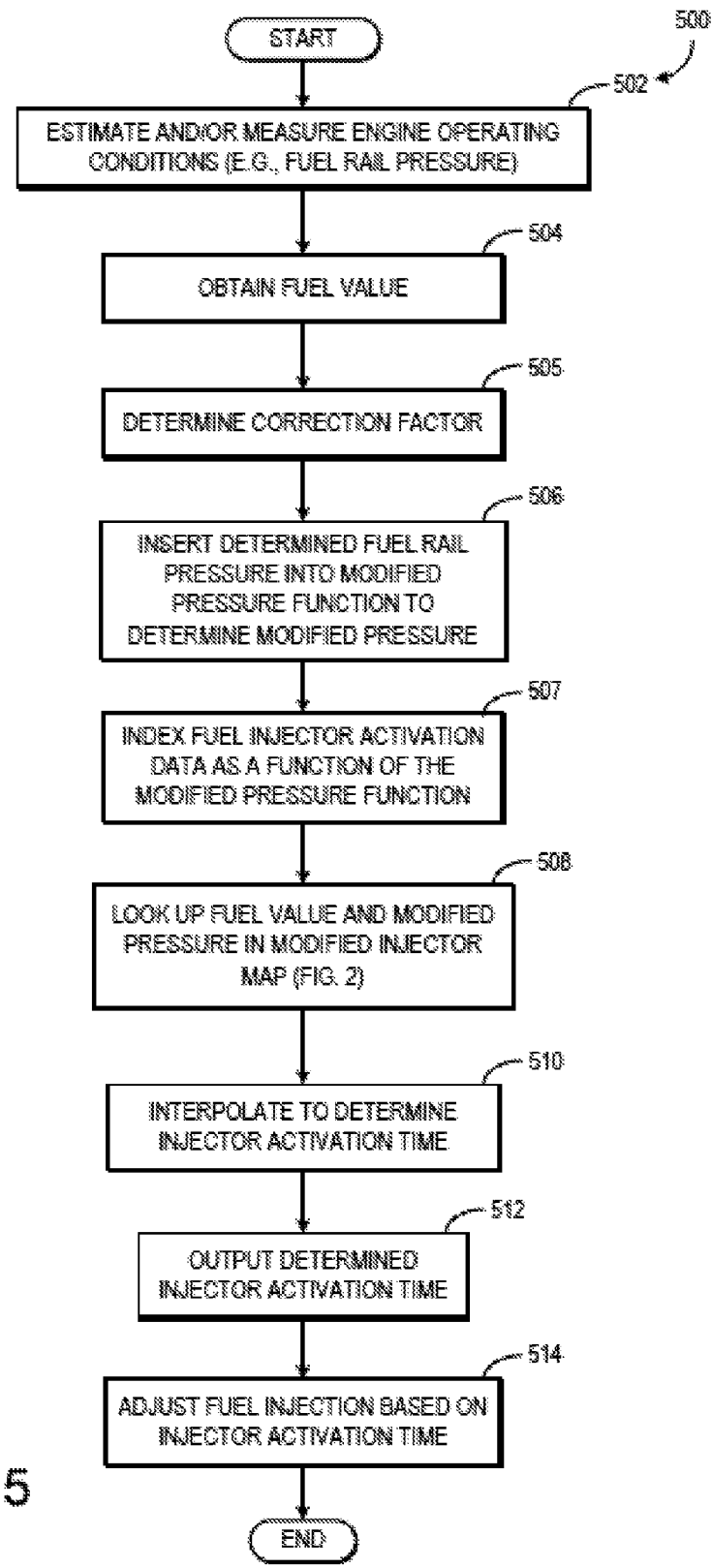
FIG. 5 shows a method for adjusting fuel injection to the engine based on an injector activation time according to an embodiment of the invention.

Turning now to FIG. 5, an embodiment of a method 500 is shown for determining a fuel injector activation output, such as a fuel injector activation time, and adjusting fuel injection to the engine based on the determined fuel injector activation output. In one example, the method 500 is executable by the controller 106 shown in FIG. 1. In particular, the controller 106 executes the method 500 repeatedly throughout engine operation to determine an injector activation time.

The method 500 begins at 502 by estimating and/or measuring engine operating conditions. Engine operating conditions may include engine speed and load, pressures in the fuel rail system, engine cylinder pressures, torque demand, boost pressure, or the like. Specifically, estimating and/or measuring engine operating conditions at 502 may include determining a fuel rail pressure. As discussed above, in one example, the fuel rail pressure may be determined based on the output of a pressure sensor (such as pressure sensor 130 in FIG. 1) positioned in the fuel rail system, upstream of a fuel injector and/or the common fuel rail.

At 504, the method includes obtaining a fuel value. In one example, a fuel value for all engine operating points may be stored in the controller memory. In another example, the fuel value may be estimated based on engine operating conditions such as torque demand. The method also includes determining the correction factor used in the modified pressure function at 505. As discussed above, the correction factor may be based on a measured and/or estimated peak cylinder pressure, cylinder pressure at time of injection, losses between a fuel rail pressure sensor and an injector nozzle, and/or additional factors that may affect a pressure drop across a restriction of the fuel injector. In one example, the correction factor may be determined based on a cylinder pressure, such as a cylinder firing pressure, and/or a loss value. Thus, the method at 505 may include determining the cylinder pressure and the loss value. The loss value may be a pressure loss between the fuel rail pressure sensor and the fuel injector nozzle.

After obtaining the desired fuel value and determining the correction factor, the method continues on to determine a modified pressure value based on the pressure (e.g., fuel rail pressure) value determined at 502 and a modified pressure function, as discussed above. Specifically, at 506 the controller inputs the determined fuel rail pressure into the modified pressure function. In one example, the modified pressure function is the function represented by equation 1 above, wherein the determined correction factor is subtracted from the determined fuel rail pressure and then the square root of the resulting value is taken. In this way, the modified pressure function may be a square root approximation. In alternate examples, the modified pressure function may a different function close to the square root function. For example, the fuel rail pressure may be raised to the 0.45 power rather than 0.5.

As discussed above, the correction factor in the modified pressure function may include a cylinder firing pressure and fuel system pressure losses. In one example, the fuel system pressure losses may be based on pressure losses in the fuel rail system between a fuel rail pressure sensor (such as pressure sensor 130 shown in FIG. 1) and a fuel injector nozzle. In alternate examples, the fuel system pressure losses may be measured at an alternate location in the fuel rail system. In some cases, the cylinder firing pressure and the fuel system pressure losses may be pre-determined and stored within the controller as one correction factor used in the modified pressure function. For example, the cylinder firing pressure may be a peak cylinder firing pressure predetermined during engine testing.

Once the controller determines the modified pressure at 506, the method continues on to 507 to index the fuel injector activation data as a function of the modified pressure function. As described above, the fuel injector activation data may be stored in an injector table, such as the injector table 200 presented at FIG. 2. The injector table may further be stored in a non-transitory computer readable storage medium with memory. As such, the controller may actively index the data in the stored injector table by the modified pressure function during engine operation when determining fuel injection command values. In one example, the modified pressure function for indexing the fuel injector activation data is the same as the modified pressure function for determining the modified pressure at 506. Thus, the resulting output from indexing the stored fuel injector activation data during engine operation may be a modified injector table indexed by the modified pressure (instead of fuel rail pressure alone). An example of the modified injector table is the second injector table 202 presented at FIG. 2. In one example, the modified injector table may then be stored in within the memory. The method then continues on to 508 to look up the fuel value (obtained at 504) and the modified pressure in the modified injector table.

At 510, the controller interpolates the indexed injector activation data in the modified injector table to determine an injector activation time for the determined modified pressure and fuel value. The method at 510 may include determining the injector activation data points within the injector table that are around the given modified pressure and fuel value. For example, the controller may locate a first modified pressure value above the determined modified pressure and a second modified pressure value below the determined modified pressure. The first and second modified pressure values are two modified pressure values out of the plurality of modified pressure values listed in the first row of the injector table (such as the first row 210 in the second injector table 202). Then, the controller may locate a first fuel value above the selected fuel value and a second fuel value below the selected fuel value. The first and second fuel values are two fuel values out of the plurality of fuel values listed in the first column of the injector table (such as the first column 212 in the second injector table 202). The cells in the injector table (containing injector activation data or times) that correspond to the first and second modified pressure values and the first and second fuel values are then selected. The controller then interpolates among the selected data points to determine the fuel injector activation time for the determined modified pressure and fuel value.

At 512, the controller outputs the determined injector activation time. Then, at 514, the controller adjusts fuel injection based on the determined injector activation time. As discussed above, adjusting fuel injection may include adjusting the fuel injection timing of one or more fuel injectors. Specifically, in one example, the controller may adjust a pulse width modulation signal to command the fuel injectors to inject fuel for a duration. The duration may be based on the fuel injector activation time. As such, the fuel injector activation time may be an amount of time the fuel injectors are open and injecting fuel into the engine cylinders.

In this way, a controller in an engine may index fuel injector activation data in a computer memory as a function of a modified pressure function, linearly interpolate among the indexed injector activation data to determine an injector activation time at a determined fuel rail pressure based on the modified pressure function, and adjust fuel injection of the engine based on the injector activation time. In one example, adjusting fuel injection includes adjusting a pulse width of one or more fuel injectors, the pulse width increasing as the injector activation time increases. Further, the controller may inject fuel within 20 degrees of top dead center at a cylinder pressure. In one example, indexing fuel injector activation data includes indexing stored fuel injector activation data by a square root of a fuel rail pressure, the fuel rail pressure offset by the cylinder pressure and a loss value and wherein the stored fuel injector activation data is stored in the computer memory of multiple engines utilizing the same fuel injectors. The loss value may be based on pressure losses in a fuel rail system between a fuel rail pressure sensor and a fuel injector nozzle. Further, the controller may linearly interpolate between a first indexed fuel injector activation time and a second indexed fuel injector activation time based on a fuel value and a modified fuel rail pressure, wherein the modified fuel rail pressure is a square root of the determined fuel rail pressure less the cylinder pressure and the loss value.

As discussed above, fuel injector activation data may be indexed within an injector table, the injector table stored in the memory of a controller, by a modified pressure value. In one example, the modified pressure value may be determined by inputting a rail pressure value into a modified pressure function. A determined, or measured, fuel rail pressure may also be transformed by the modified pressure function to determine the modified pressure. Then, the determined modified pressure and a fuel value may be used as the input into the indexed injector table. The controller then interpolates among the indexed fuel injector activation data to determine a fuel injector activation time at the determined fuel rail pressure and fuel value. Fuel injection of the engine may then be adjusted based on the determined fuel injector activation time. Indexing the injector table by a modified pressure (e.g., based on the modified pressure function) transforms the fuel injector activation data stored in the injector table to be more linear between cells of the injector table. As a result, interpolation error may be reduced, thereby increasing the accuracy of the fuel injector activation time output by the controller. Consequently, increasing the accuracy of fuel injector control may increase fuel consumption efficiency of the engine while also reducing engine emissions variation.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A non-transitory computer readable storage medium with memory, comprising:
fuel injector activation data indexed in the memory according to two input parameters, where a first of the two input parameters is a function of a fuel rail pressure, and where the function is a modified pressure function that transforms the indexed fuel injector activation data so a relationship between a second of the two input parameters and the first input parameter is more linear;
instructions for determining a modified pressure value based on a determined pressure and the modified pressure function; and
instructions for generating a fuel injector activation output by interpolating among the indexed fuel injector activation data with the modified pressure value as the first input parameter.

2. The medium of claim 1, wherein the determined pressure is a measured fuel rail pressure, the measured fuel rail pressure measured upstream of a fuel injector and wherein the fuel rail pressure is a liquid fuel rail pressure of a liquid fuel injected into an engine.

3. The medium of claim 1, wherein the modified pressure function includes a square root approximation, where the square root approximation linearizes the fuel injector activation data stored within one injector map in the memory.

4. The medium of claim 1, wherein the modified pressure value is further based on a representative cylinder pressure during injection and on fuel rail system pressure losses.

5. The medium of claim 1, wherein the second input parameter is a fuel value and wherein interpolating among the indexed fuel injector activation data is further based on the fuel value, the fuel value including a quantity of fuel injected by a single fuel injector stroke.

6. The medium of claim 1, wherein the second input parameter is a fuel value and wherein the fuel injector activation data is stored in the memory in one injector table, the one injector table having a first number of columns and a second number of rows, both greater than one.

7. The medium of claim 6, wherein a first row of the second number of rows includes a range of modified pressure values corresponding to a range of fuel rail pressures and a first column of the first number of columns includes a range of fuel values, the range of fuel values including a range of quantities of fuel injected by a single fuel injector.

8. The medium of claim 7, wherein each cell in the one injector table includes a fuel injector activation time corresponding to one of the modified pressure values in the range of modified pressure values and one of the fuel values in the range of fuel values.

9. The medium of claim 6, wherein the modified pressure function transforms the fuel injector activation data stored in the one injector table to be more linear between cells of the one injector table.

10. The medium of claim 6, wherein the instructions for generating the fuel injector activation output by interpolating among the indexed fuel injector activation data include instructions for performing a multi-step linear interpolation between the indexed fuel injector activation data in the one injector table to determine a fuel injector activation time at the determined pressure and fuel value.

11. The medium of claim 10, further comprising instructions for outputting the determined fuel injector activation time and adjusting fuel injection based on the determined fuel injector activation time and wherein the modified pressure function transforms the indexed fuel injector activation data so the relationship between the second input parameter and the first input parameter is more linear than if the fuel injector activation data were indexed in the memory according to fuel rail pressure.

12. The medium of claim 11, wherein adjusting fuel injection includes adjusting an injector open time.

13. A method for controlling a system having an engine, the method comprising:
indexing fuel injector activation data in a computer memory as a function of a modified pressure function, where the indexed fuel injector activation data is stored in the computer memory in an injector map, where the modified pressure function is a function of fuel rail pressure and transforms the stored fuel injector activation data to be more linear between data points of the injector map, and where each fuel injector activation data point of the fuel injector activation data corresponds to a modified pressure and a fuel value in the injector map;
linearly interpolating among the indexed injector activation data of the injector map to determine an injector activation time at a determined fuel rail pressure based on the modified pressure function; and
adjusting fuel injection of the engine based on the injector activation time.

14. The method of claim 13, further comprising injecting fuel within 20degrees of top dead center at a cylinder pressure.

15. The method of claim 14, wherein indexing fuel injector activation data includes indexing the stored fuel injector activation data by a square root of a fuel rail pressure, the fuel rail pressure offset by the cylinder pressure and a loss value and wherein the stored fuel injector activation data is stored in the computer memory of multiple engines utilizing the same fuel injectors, and wherein the injector map includes one injector table having a first number of columns and a second number of rows, both greater than one, where a first row of the second number of rows includes a range of modified pressure values and a first column of the first number of columns includes a range of fuel values, the range of fuel values including a range of quantities of fuel injected by a single fuel injector, and where each cell in the injector table includes a fuel injector activation time corresponding to one of the modified pressure values in the range of modified pressure values and one of the fuel values in the range of fuel values.

16. The method of claim 15, wherein the loss value is based on pressure losses in a fuel rail system between a fuel rail pressure sensor and a fuel injector nozzle and wherein adjusting fuel injection includes adjusting a pulse width of one or more fuel injectors, the pulse width increasing as the injector activation time increases.

17. The method of claim 15, wherein the linearly interpolating among the indexed injector activation data includes linearly interpolating between a first indexed fuel injector activation time and a second indexed fuel injector activation time in the one injector table based on a fuel value and a modified fuel rail pressure, wherein the modified fuel rail pressure is a square root of the determined fuel rail pressure less the cylinder pressure and the loss value.

18. A fuel rail system, comprising:
a common fuel rail;
a plurality of fuel injectors operable to inject fuel from the common fuel rail to cylinders of an engine;
a non-transitory computer readable storage medium with memory, wherein one injector table is stored within the memory, and wherein the one injector table comprises injector data indexed according to a modified pressure function that creates a more linear relationship between the injector data within the one injector table; and a controller operable to control the fuel injectors based on a fuel injector activation time, wherein the controller is configured to determine the fuel injector activation time by interpolating the indexed injector data within the one injector table based on a determined fuel rail pressure and a quantity of fuel injected by a single fuel injector stroke.

19. The system of claim 18, wherein the modified pressure function includes a square root of a fuel rail pressure offset by a peak pressure in the cylinders and pressure losses in the fuel rail system and wherein the determined fuel rail pressure is measured from one or more pressure signals sent to the controller by at least one pressure sensor positioned upstream of the common fuel rail and wherein the common fuel rail is a liquid fuel rail injecting liquid fuel.

20. The method of claim 13, wherein indexing the stored fuel injector activation data as a function of the modified pressure function transforms the stored fuel injector activation data to be more linear between data points of the injector map than if indexed by fuel rail pressure.

* * * * *